United States Patent
Horne et al.

(10) Patent No.: US 6,464,753 B2
(45) Date of Patent: Oct. 15, 2002

(54) FURNACE FLUE DUST PROCESSING METHOD

(75) Inventors: Deane A. Horne, Toledo, OH (US); Dennis W. Coolidge, Rudolph, OH (US)

(73) Assignee: Maumee Research & Engineering, Incorporated, Northwood, OH (US)

( * ) Notice: Subject to any disclaimer, the term of this patent is extended or adjusted under 35 U.S.C. 154(b) by 0 days.

(21) Appl. No.: 09/884,295

(22) Filed: Jun. 19, 2001

(65) Prior Publication Data

US 2002/0011133 A1 Jan. 31, 2002

Related U.S. Application Data

(63) Continuation-in-part of application No. 09/597,923, filed on Jun. 19, 2000, now Pat. No. 6,395,060.

(51) Int. Cl.$^7$ ............................................... C22B 7/02
(52) U.S. Cl. ........................... 75/694; 75/652; 75/754; 75/762; 75/951
(58) Field of Search .................... 75/951, 474, 477, 75/479, 482, 694, 662, 754, 762

(56) References Cited

U.S. PATENT DOCUMENTS

| | | |
|---|---|---|
| 4,238,222 A | 12/1980 | Serbent et al. |
| 4,255,185 A | 3/1981 | Schulte et al. |
| 4,266,966 A | 5/1981 | Stirling |
| 4,396,423 A | 8/1983 | Stephens, Jr. et al. |
| 4,447,261 A | 5/1984 | Hilbrans et al. |
| 4,491,470 A | 1/1985 | Hilbrans et al. |
| 4,525,208 A | 6/1985 | Yasukawa et al. |
| 4,612,041 A | 9/1986 | Matsuoka et al. |
| 4,673,431 A | 6/1987 | Bricmont |
| 4,758,268 A | 7/1988 | Bishop et al. |
| 4,802,919 A | 2/1989 | Fey |
| 4,836,847 A | 6/1989 | Bishop et al. |
| 5,013,532 A | 5/1991 | Sresty |
| 5,180,421 A | 1/1993 | Rostoker et al. |
| 5,186,741 A | 2/1993 | Kotraba et al. |
| 5,198,190 A | 3/1993 | Philipp et al. |
| 5,338,336 A | 8/1994 | Greenwalt |
| 5,364,447 A | 11/1994 | Philipp et al. |
| 5,470,375 A | 11/1995 | Greenwalt |
| 5,496,392 A | 3/1996 | Sims et al. |
| 5,538,532 A | 7/1996 | Keegal, Jr. |
| 5,547,490 A * | 8/1996 | Discher et al. ............. 266/145 |
| 5,589,118 A | 12/1996 | Ford, Jr. et al. |
| 5,667,553 A | 9/1997 | Keegal, Jr. |
| 5,728,193 A | 3/1998 | Dighe et al. |
| 5,906,671 A | 5/1999 | Weinwurm et al. |
| 6,132,488 A * | 10/2000 | Hara et al. ................... 423/464 |

FOREIGN PATENT DOCUMENTS

| | | | | |
|---|---|---|---|---|
| DE | 0632843 B1 | * | 3/1993 | ............. C22B/1/00 |
| WO | WO 9718338 A1 | * | 5/1997 | ............. C22B/7/02 |

OTHER PUBLICATIONS

Value from EAF Dust–The ADPL Process, presented by Kevin Holliday at Steel Mill Wastes & By–Products 2000, Apr. 10–12, 2000.

First Experiences and Results of the BSN–Process to Recover Zinc and Lead from EAF Dust, presented by Karl Haase at Learn Strategies for Coping with Steel Mill Wastes and Profiting from By –Products, May 17–19, 1999.

* cited by examiner

Primary Examiner—Roy King
Assistant Examiner—Tima McGuthry-Banks
(74) Attorney, Agent, or Firm—MacMillan, Sobanski & Todd, LLC

(57) ABSTRACT

A method of processing flue dust that contains one or more compounds from a first group of zinc, lead and cadmium compounds, and contains iron compounds, involves heating the flue dust to cause a substantial portion of one or more of the compounds of the first group to become gas-borne. A carbonaceous material is introduced to the remaining flue dust, and the flue dust/carbonaceous material mixture is heated to cause a substantial portion of the remaining compounds from the first group to become gas-borne while retaining a substantial portion of the iron in a non-gas-borne condition. The gas-borne compounds are separated from the non-gas-borne compounds.

16 Claims, 3 Drawing Sheets

FURNACE FLUE DUST PROCESSING METHOD

CROSS-REFERENCE TO RELATED APPLICATIONS

This application is a Continuation-In-Part of U.S. patent application Ser. No. 09/597,923, filed Jun. 19, 2000 U.S. Pat. No. 6,395,060.

TECHNICAL FIELD

This invention relates to a method of treating the flue dust of industrial processes, such as the flue dust from steel making processes which contain such materials as zinc, lead or cadmium, to segregate and thereby recover valuable constituents.

BACKGROUND OF THE INVENTION

Flue dust from certain steel making operations such as electric arc furnaces is classified as a hazardous waste material because of the presence of lead and cadmium. Also, it has been reported that electric arc furnace dust "contains several thousand nanogrammes of dioxins per kilogramme of dust". "Value from EAF Dust—The ADPL Process", by Kevin Holliday, published Apr. 10, 2000. Yet electric arc furnace dust contains valuable components if separation of the various constituents can be made economically. A process for recovering steel mill and foundry dusts containing zinc is disclosed in U.S. Pat. No. 3,850,613, which is herein incorporated by reference in its entirety. The flue dust is formed into compacts and then heated to reduce the zinc and lead to a metal, and then to volatilize the metal. The metal vapor is then combined with oxygen to form gas-borne metallic oxides.

A commonly used process for the processing of flue dust is the Waelz process, as disclosed in U.S. Pat. No. 4,525,208, which is also herein incorporated by reference in its entirety. The Waelz kiln process involves mixing carbon, usually in the form of coke or coal, with the flue dust to form a mixture. The mixture is heated in a reducing atmosphere to volatilize the metallic zinc, and the metallic zinc is reoxidized to form zinc oxide, a stable material having a high melting temperature. The process is carried out in a counterflow type rotary kiln. The iron is discharged and the zinc oxide is carried gas-borne along with the kiln exhaust stream. A substantial portion of the heat, if not all of the heat required to initially vaporize the zinc is generated by the burning of the carbon in the carbon/flue dust mixture within the kiln. The combustion process within the kiln requires a substantial amount of air/oxygen, and the flow of this air, and the combustion process itself, generate a significant amount of turbulence within the kiln. As a result of this turbulence, a substantial amount of iron, calcium, silicon and aluminum compounds are also made gas-borne within the kiln, and these contaminate the exhaust stream of potentially valuable zinc oxides.

U.S. Pat. No. 5,013,532, discloses a process using a stream of hydrogen gas to reduce the zinc contained in electric arc furnace dust, followed by volatilizing the metallic zinc, and reoxidizing the metallic zinc to form zinc oxide. A process for removing zinc and other heavy metals from compacted furnace dust and carbon mixture is disclosed in U.S. Pat. No. 5,186,741, which is herein incorporated by reference in its entirety. A process for removing zinc, lead and cadmium from electric arc furnace dust, and metallizing the iron present in the dust to return it to the steel making operation is disclosed in U.S. Pat. No. 5,601,631, which is herein incorporated by reference in its entirety.

In addition to the methods for handling flue dust disclosed above, another known method for processing flue dust involves a rotary kiln that is heated exclusively by a heat source external of the kiln, such as by gas combustion on the outside of the kiln. The carbon necessary for the endothermic chemical reaction (to reduce the zinc and cadmium to a metallic, vaporized form) is supplied from the coke mixed with the flue dust. However, the lack of oxygen within the kiln substantially prevents combustion of the carbon, and essentially no heat is supplied to the flue dust internally of the kiln. Such an indirectly heated rotary kiln process is disclosed in a paper entitled "First Experiences and Results of the BSN-Process to Recover Zinc and Lead from EAF Dust", by Karl Haase, published May 17, 1999.

It would be advantageous if there could be developed flue dust handling processes that are even more efficient than those described above. Preferably, such a method would reduce the energy consumed in the process, and would result in greater purity of the separated constituents in the various output streams. Also, ideally, the ability to treat environmentally unfriendly substances such as dioxins and furans would be enhanced.

SUMMARY OF THE INVENTION

The above objects as well as other objects not specifically enumerated are achieved by a method of processing flue dust that contains one or more compounds from a first group of zinc, lead and cadmium compounds, and contains iron compounds. The method involves heating the flue dust to cause a substantial portion of one or more of the compounds of the first group to become gas-borne. A carbonaceous material is introduced to the remaining flue dust, and the flue dust/carbonaceous material mixture is heated to cause a substantial portion of the remaining compounds from the first group to become gas-borne while retaining a substantial portion of the iron in a non-gas-borne condition. The gas-borne compounds are separated from the non-gas-borne compounds.

According to this invention, there is also provided a method of processing flue dust that contains lead compounds and iron compounds. The method includes heating the flue dust to cause a substantial portion the lead to become gas-borne, and introducing a carbonaceous material to the remaining flue dust. The flue dust/carbonaceous material mixture is heated to cause additional constituents of the flue dust to become gas-borne while retaining a substantial portion of the iron in a non-gas-borne condition. The gas-borne compounds are separated from the non-gas-borne compounds.

According to this invention, there is also provided a method of processing flue dust that contains one or more compounds from a first group of zinc, lead and cadmium compounds, and contains one or more compounds from a second group of iron, silicon, calcium, magnesium and aluminum compounds. The method includes heating the flue dust to cause a substantial portion of one or more of the compounds of the first group to become gas-borne. A carbonaceous material is introduced to the remaining flue dust, and the flue dust/carbonaceous material mixture is heated to cause a substantial portion of the remaining compounds from the first group to become gas-borne while retaining a substantial portion of the second group in a non-gas-borne condition. The gas-borne compounds are separated from the non-gas-borne compounds.

Various objects and advantages of this invention will become apparent to those skilled in the art from the following detailed description of the preferred embodiment, when read in light of the accompanying drawings.

DETAILED DESCRIPTION OF THE INVENTION

The method of processing flue dust of the invention involves starting with a flue dust that contains one or more compounds from a first group of zinc, lead and cadmium compounds, and contains one or more compounds from a second group of iron, silicon, calcium, magnesium and aluminum compounds. The flue dust can come from numerous sources, but is typically the byproduct of a steel making operation that uses an electric arc furnace (EAF), a basic oxygen furnace (BOF) or similar processes. The flue dust is mixed with a carbonaceous material, which is preferably coke, but can be any other suitable form of carbon, as is well known in the art. The flue dust/carbonaceous material mixture is heated under non-turbulent conditions to cause a substantial portion of the compounds from the first group to become gas-borne while retaining a substantial portion of the compounds of the second group in a non-gas-borne condition. The gas-borne compounds are separated from the non-gas-borne compounds.

Figure 1:
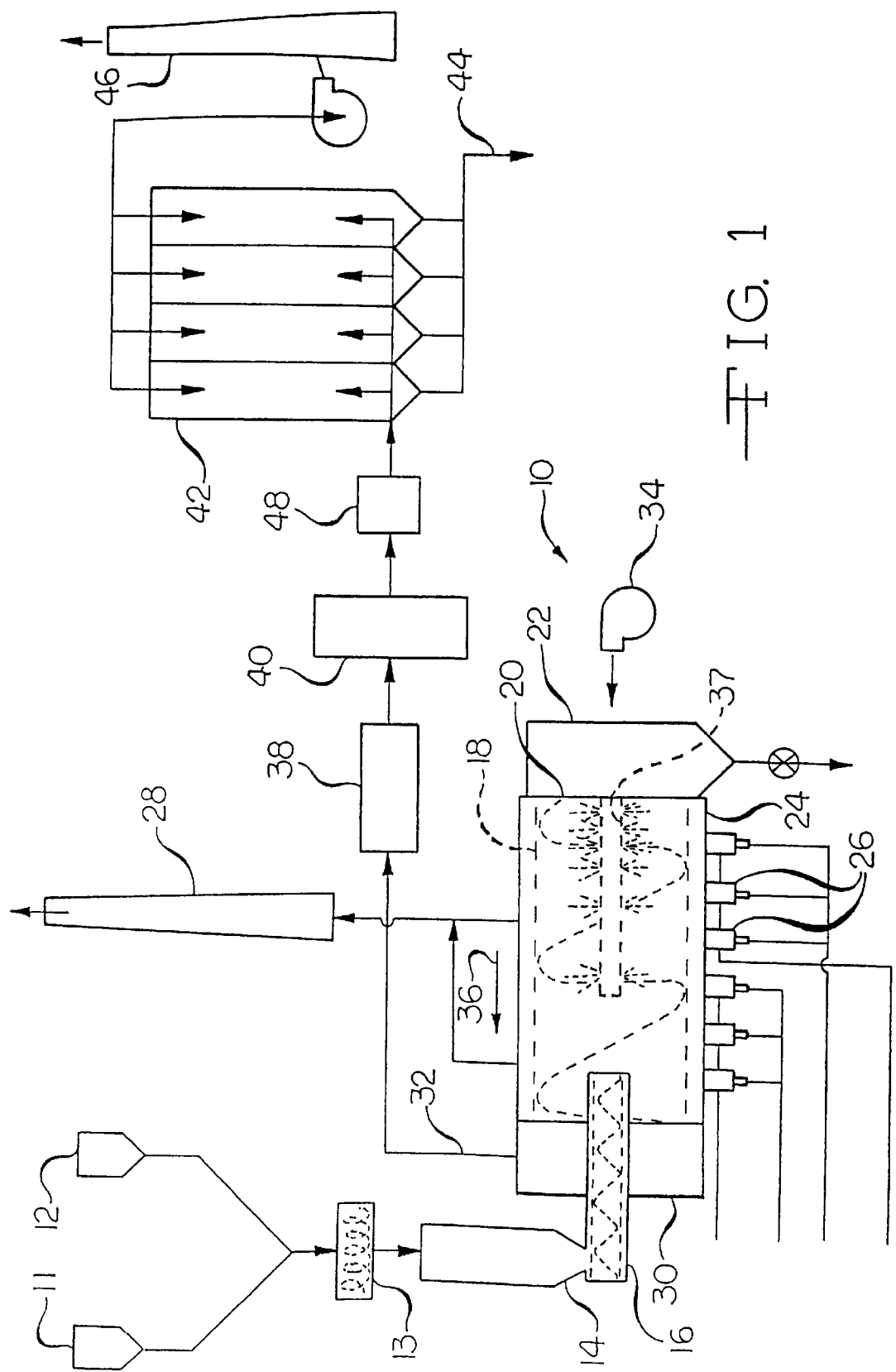
FIG. 1 is a schematic view of a generalized flue dust processing apparatus.

As shown in FIG. 1, the flue dust recovery apparatus is indicated generally at 10. The flue dust recovered from the electric arc furnace, or from any other source that contains one or more compounds from a first group of zinc, lead and cadmium, is supplied to a flue dust supply hopper 11. A fine carbonaceous material, such as coke, is supplied to a coke hopper 12. The flue dust and coke are both introduced into a blender 13 and the blended mixture is stored in a feed hopper 14. The blended mixture is subsequently supplied via a feeder 16, which is preferably a screw conveyor or screw feeder, into the interior of an externally heated cylindrical retort 18, which can be a rotary kiln, rotating within a stationary insulation lined heating chamber 24.

Within the cylindrical retort 18, the carbonaceous material reacts with the zinc, lead and cadmium, producing a metallic form of those elements. The metallic zinc and cadmium vaporize or boil out of the mixture, and the lead comes out as lead oxide that is somewhat volatile at the typical operating temperature of about 1,800 degrees F. These vapors then mix with the gaseous compounds within the retort, reacting with oxygen and/or carbon dioxide to form gas-borne particles of zinc oxide, lead oxide and cadmium oxide. It should be appreciated by one skilled in the art that the crude zinc oxide produced in this way will exist as a very fine particulate that is easily entrained in the gas flow within the retort. One skilled in the art will also appreciate while the zinc, lead and cadmium compounds will boil out of the mixture as a gas phase, the iron, calcium, silicon and aluminum compounds in the flue dust will remain as solids in the mixture within the retort. The gases, including the very fine gas-borne zinc, lead and cadmium oxides, exit the feed end 30 of the retort through an exhaust duct 32 as an exhaust gas stream. The remaining solid flue dust mixture travels through the cylindrical retort 18 to the exit end 20 of the retort, and then the processed material is removed and collected in a discharge hopper 22 for removal as desired.

It will also be appreciated that the process described above is endothermic and thus requires energy input to proceed. The required energy is supplied to the flue dust/carbon material in the retort from two sources. The primary heating source, supplying 50 to 90 percent of the required energy, is an annular outer chamber 24 that surrounds the cylindrical retort 18 concentrically, and provides heat to the retort as the retort rotates. A fuel/oxygen combination, such as natural gas/air, is provided to a series of burners 26, producing combustion within the annular combustion chamber 19 to provide heat to the retort. Alternatively, electric heating elements (not shown), either spaced apart from the retort exterior surface or using the retort itself as a resistance heating element, may be used as the primary heating source to provide heat to the retort. Preferably, the retort structure is designed for good heat transfer through the retort walls from the annular outer chamber 24. The exhaust gases from the combustion process exit the annular combustion chamber 24 via exhaust stack 28.

The secondary source of heat supplying 10 to 50 percent of the required energy to the material in the retort is provided by partial combustion of the carbonaceous material in the mixture. The cylindrical retort 18 is a closed system and combustion within the retort is supported by a low velocity flow of air (or oxygen) provided by fan 34, thereby creating a low velocity gas flow in the retort. The preferred flow is in the direction of arrow 36, i.e., in the direction from the retort exit end 20 to the retort feed end 30, as shown in the drawing. This low velocity gas flow is counter to the flow of the feed mixture. However, the gas flow could be co-flowing with the mixture in the retort by interchanging the ends of the retort where the exhaust gas stream is removed and the air feed 34 is located. Optionally, the air (or oxygen) can be supplied into the retort using an orificed pipe or sparging conduit 37 that distributes the air according to a designed air distribution arrangement. The sparging conduit orifices for the release of air into the retort are preferably arranged so that there is a greater distribution of orifices in the upflow end of the sparging conduit 37, i.e., to the right when viewing FIG. 1.

As also shown in FIG. 1, the retort exhaust gas stream is further processed through an afterburner 38, typically at a temperature of about 1800 degrees F., to completely combust carbon monoxide and organic materials, such as dioxins and furans, released from the feed mixture. The exhaust flow is then quenched in a quencher 40, using either air or water, and filtered through a baghouse 42 where the particulate matter is removed from the exhaust gases as a particulate process stream 44. The remaining exhaust stream is vented through exhaust stack 46, or may be further processed as desired. Such further processing could include an additional step of passing the remaining exhaust gas stream through another afterburner prior to venting the remaining exhaust stream through the stack 46. This additional afterburner, not shown, could be similar to afterburner 38, and its purpose would be to combust the organic materials, such as dioxins and furans, released from the feed mixture. This additional afterburner could be used in place of or in combination with the afterburner 38.

In operation, a typical blend of carbonaceous material and furnace flue dust entering the cylindrical retort 18 is set to provide from about 15 to about 30 percent carbon by weight in the total mixture of flue dust and carbonaceous material, although other formulations can be used. The retort is heated to a temperature of about 1,800 degrees F. by the outer annular chamber using either a fuel/air mixture, or electric heating, and the mixture is fed into the retort. The residence time in the retort is preferably within the range of from about 30 minutes to about 120 minutes, although many factors can influence the time needed for processing. The air added to the cylindrical retort 18 by the fan 34 supplies enough oxygen to combust some of the carbonaceous material in the feed mixture. The volume of air is low enough that the velocity (gas exchange) within the retort is kept very low, preferably within the range of from about 0.5 to about 2 feet per second, based on the volume of air introduced on a standard temperature and pressure basis, and on the cross-sectional area of the retort.

A low gas velocity within the retort is highly advantageous for the operation of the process of the invention. The principle desirable recoverable constituent of commercial value is zinc, in the form of zinc oxide, and as previously described, this material is easily entrained in a low velocity gas flow. The lead and cadmium compounds also become gas-borne, and are removed with the low velocity gas flow. In contrast, the bulk flue dust feed material contains larger and heavier particles and will not become entrained in the gas flow as long as the turbulence of the gas flow is minimized. The compounds of iron, calcium, silicon, magnesium and aluminum are not desirable in the zinc recovery stream, and therefore it is highly advantageous that these compounds do not become gas-borne, and preferably they remain in the retort for removal at the exit end 20 into the discharge hopper 22. It can be seen that by providing a substantial amount of the heating required for the process through the exterior of the retort, the amount of combustion required inside the retort is minimized, and therefore the volume, and thus the velocity and turbulence of the gases in the retort are markedly reduced.

As a measure of the reduction in gas flow and turbulence possible during operation of the invention, a comparison of mass flow rates between the process of the invention and a typical Waelz kiln process can be made. In a Waelz kiln process the ratio of the mass units of exhaust from the kiln to the mass units of the input EAF dust/carbon mixture is typically at least 4, and frequently higher. In contrast, using the invention, the ratio of the mass units of exhaust from the retort to the mass units of the input EAF dust/carbon mixture is preferably within the range of from about 0.5 to about 2.5, and more preferably within the range of from about 1.0 to about 2.0.

As another measure of the lower velocity within the retort, a comparison of the gas velocities within the retort in both the Waelz process and the process of the invention can be made. In a Waelz kiln process the gas has a net velocity of at least 4.0 feet per second in the flow direction 36, whereas, using the process of the invention, the gas flow has a net velocity within the range of from about 0.5 to about 1.5 feet per second. The net velocity is calculated using the mass flow rate of the constituents and the cross-sectional area of the retort.

One of the advantages of the reduced flow of the retort exhaust gas stream brought about by the use of the invention is that there is a smaller quantity of mass to be incinerated in the afterburner 38. This provides the benefit of an overall lower energy consumption to operate the process. Also, savings in capital costs can be realized because the afterburner equipment and all of the flue gas treatment components, including the quencher 40, optional separator 48, and baghouse 42 can be sized for a smaller throughput.

In operation, a typical blend of fuel and flue dust entering the cylindrical retort 18 is primarily zinc, carbon and iron, as shown in the Table below. The processed material passing through the retort and recovered in the discharge hopper 22 is predominately iron oxides. Calcium oxide, alumina and silica are also present in significant amounts, while the zinc, cadmium, and lead constituents are substantially removed. In contrast, the fume material (stream 44) is predominately zinc oxide and includes only trace amounts of iron. Material such as this is a valuable feed stock to zinc refiners.

As shown in the Table below, the metal compound collected in the baghouse is primarily zinc oxide, with minor amounts of lead oxide, and cadmium oxide and chloride.

TABLE

Material Constituencies

| | Blended Mixture (Flue Dust and Coke) | Processed Flue Dust In Discharge Hopper | Fume Stream |
|---|---|---|---|
| Carbon | 20.4% | 0.026% | — |
| Zinc | 14.8% | 1.01% | 65.7% |
| Cadmium | 0.029% | <0.001% | 0.1% |
| Lead | 1.51% | 0.005% | 6.4% |
| Iron | 21.2% | 41.0% | 0.22% |
| Silica | 3.0% | 5.2% | — |
| Alumina | 0.96% | 1.7% | — |
| Chloride | 3.6% | — | 16% |

As can be seen from the Table, the amount of iron in the recovered fume stream 44 is less than 1 percent. In contrast, in a Waelz kiln process the fume stream is contaminated by iron in an amount that is typically within the range of from about 2.5 to about 7.5 percent. Accordingly, the purity of the recovered crude zinc oxide is vastly improved by the process of the invention.

Although the invention has been illustrated as using a cylindrical retort, it is to be understood that the process of the invention can be carried out using other heating vessels, such as furnaces or ovens, where the flue dust is heated under non-turbulent conditions, and a low velocity gas flow removes practically all of the zinc, cadmium and lead, without removing significant amounts of iron, lime, silica or alumina. One of the advantages of the invention is that there is no need for agglomerating the flue dust, although the invention can be used with the inclusion of an agglomerating step. Instead, the flue dust is merely blended with fine carbonaceous material and introduced into the cylindrical retort.

Some of the constituents of the retort exhaust gas stream are alkali metals and metallic chlorides. The alkali metals found in such retort exhaust streams are typically, sodium and potassium. Metallic chlorides for purposes of this invention include iron, zinc, lead, and cadmium chlorides, It would be advantageous if these chloride compounds could be removed from the fume stream 44.

Typically, metallic chlorides are more volatile than the corresponding metallic oxides. In the case of the alkali metals, both the oxides and chlorides are more volatile than the oxides of zinc, lead, and cadmium. It would be advantageous if the chloride compounds and alkali metals could be separated from the zinc, lead, and cadmium oxides. Therefore, an optional separator 48 can be inserted into the process to remove the solid zinc, lead, and cadmium oxides, from the gaseous chloride and alkali metal compounds. Typically, this can be accomplished by maintaining the gas stream in the separator 48 at a temperature greater than about 500 degrees F., so that the chloride and alkali metal compounds remain as a vapor. At temperatures below about 1000 degrees F. the oxides from the group of zinc, lead and cadmium remain solid, and these can be removed from the vaporous chloride and alkali metal compounds using a cyclone separator or any other suitable means. The resulting output is a high purity zinc oxide stream 49.

It can be seen that there is produced a gas stream containing solid metallic oxides from a first group of zinc, lead and cadmium, and further containing one or more compounds from an additional group of metallic chlorides and alkali metal oxides. The gas stream is maintained at a temperature at which the metallic chlorides and alkali metal oxides are gaseous and the solid metal oxides remain solid. The solid metal oxides are separated from the metallic chlorides and alkali metal oxides.

Figure 2:
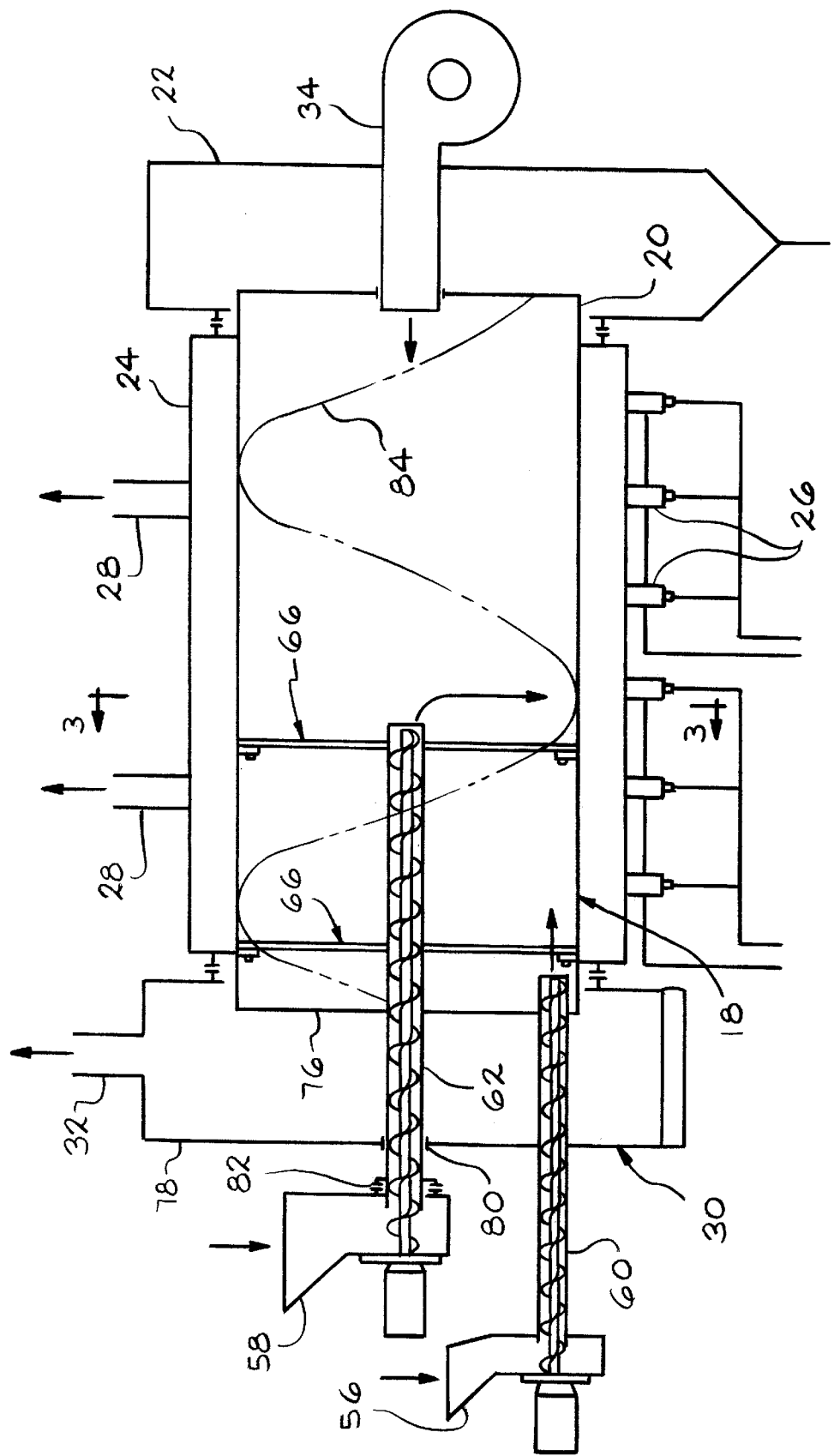
FIG. 2 is a schematic view in elevation of the apparatus of FIG. 1, showing the introduction of input materials according to the invention.
Figure 3:
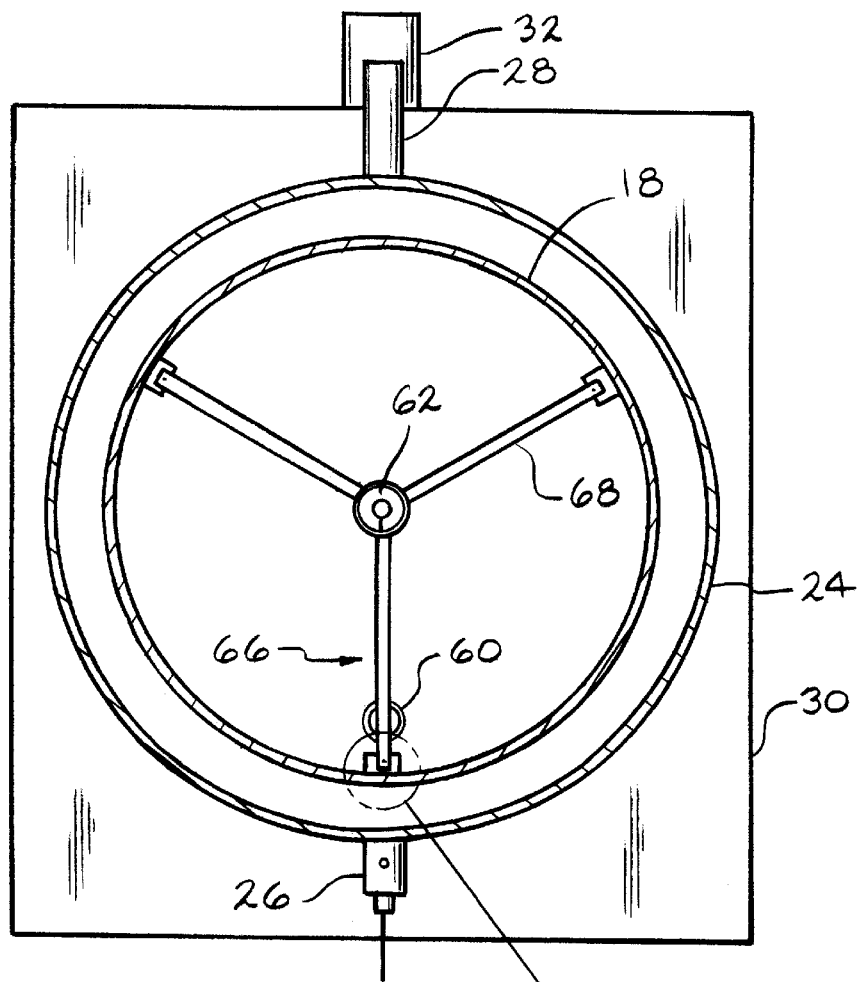
FIG. 3 is a cross-sectional view in elevation of the apparatus of FIG. 2, taken along line 3—3.
Figure 4:
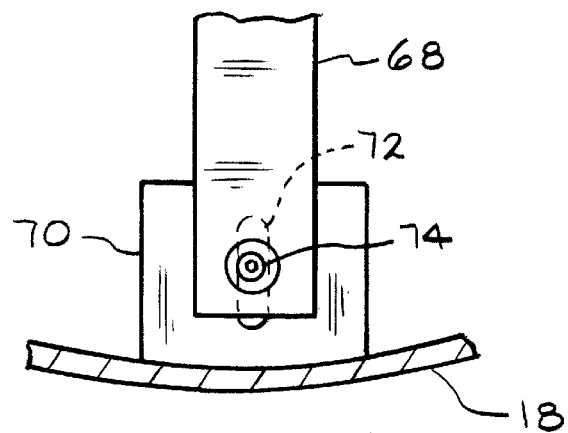
FIG. 4 is a view in elevation of a portion of the support system for the auger of apparatus of FIG. 2.

In a second embodiment of the invention, an improvement in removal of lead from the effluent gases or fume is realized by introducing the carbonaceous material (e.g. coke) to the retort separately from the introduction of the electric arc furnace dust. As shown in FIGS. 2–4 a supply of flue dust from a flue dust supply hopper 56 is introduced into the retort 18 at a first location, such as at the feed end 30 of the retort 18 by means of a flue dust feeder 60. In contrast, the carbonaceous material, such as coke, is supplied from a coke hopper 58 and is introduced to the retort 18 by means of the coke feeder 62, which is positioned at a second location in the retort 18, such as well downstream from the feed end 30 of the retort 18, as shown in FIG. 2. The feeders 60 and 62 can be any type of feeder, but screw feeders are preferred. It is to be understood that the carbonaceous material need not be coke, but could be any of several sources of carbon, such as coal. The extent to which the coke screw feeder extends into the retort 18 depends on several factors including the temperature in the retort, the amount of mixing of the flue dust in the feed end of the retort, and the overall forward velocity of the flue dust within the retort.

In order to accommodate the suspension of the coke screw feeder deep into the interior of the retort, a suspension system 64 is provided. The suspension system 64 includes two spoked support mechanisms 66, each of which contains a plurality of spokes 68 as shown in FIG. 3. It is to be understood that there could be only one support mechanism, or more than two support mechanisms. The support mechanisms 66 rigidly connect the coke screw feeder 62 to the rotating retort 18, and therefore the coke screw feeder rotates with the retort. To accommodate thermal expansion during operation of the flue dust recovery apparatus 10, the rigid connection between the spokes and the retort is provided with a slotted attachment. As shown in FIG. 4, each spoke 68 is connected to the wall of the retort 18 by means of an anchor plate 70. A slot 72 in the anchor plate 70 enables the connecting bolt 74 to move radially within the retort to accommodate thermal expansion and contraction of the apparatus. It is to be understood that other expansion mechanisms could be employed to accommodate thermal expansion. Where the coke screw feeder 62 penetrates the feed end wall 76 of the retort 18, the screw feeder can be rigidly attached since both the screw feeder and the retort rotate together. Where the coke screw feeder penetrates the wall 78 of the feed end 30, a sleeve or collar 80 or other mechanism providing a gaseous seal but also allowing rotation is provided so that the coke screw feeder can rotate. At the extreme forward end of the coke screw feeder 62 a mechanical break 82 is provided to reconcile the fact that the screw feeder is rotating and the coke hopper 58 is stationary.

Although the invention described illustrates the coke screw feeder 62 as being rotating with the rotating retort, it is to be understood that in another variation of the invention, the coke screw feeder 62 could be mounted in a stationary configuration. In this case, the support mechanism 66 would still be rigidly attached to the rotating retort 18. According to this variation, the stationary screw feeder 62 would be slidingly mounted at the center of the support mechanism 66 with a collar, not shown, or other mechanism to allow the support mechanism 66 to rotate while suspending the stationary screw feeder 62. A similar sleeve or collar, not shown, would be needed where the coke screw feeder penetrates the feed end wall of the retort 18. (It is advantageous for the support mechanism 66 to rotate with the retort to accommodate the retort auger 84, which is also rotating. If the support mechanism were stationary and slidingly engaging the walls of the retort, a way to avoid interference with the retort auger 84 would have to be developed.)

The purpose of these separate feed streams (the flue dust introduced by screw feeder 60 and the coke introduced by screw feeder 62) introduced in separate locations within the same retort according to this this second embodiment is to enable the lead component of the flue dust to have a chance to be heated and vaporized before the lead can combine with the carbon in the coke. The lead component of the flue dust is primarily in the form of lead chloride. When the lead chloride is introduced into the retort in the first location, the lead chloride, having a relatively low vapor pressure, quickly vaporizes. However, if the lead chloride is combined with the carbon from the coke, as is the case in the first embodiment described above, the lead chloride is reduced to a metallic form of lead before the lead chloride can be vaporized. The metallic lead then reacts with the gaseous compounds within the retort, reacting with oxygen and/or carbon dioxide to form particles of lead oxide. Lead oxide is somewhat volatile and evaporates to be collected in the baghouse.

In contrast to the process of the first embodiment, the process of the second embodiment involves heating the flue dust near the feed end 30 of the retort 18, before the flue dust comes into substantial contact with the coke. In the absence of contact with the coke, the lead remains as lead chloride and vaporizes to form lead chloride vapor. There is a marked difference between the vapor pressures of the lead oxide produced in the process of the first embodiment and the lead chloride of the second embodiment. Therefore, the residence time required in the kiln to remove the lead will be much shorter if the process of the second embodiment is followed.

To illustrate the differences in lead removal between the processes of the first and second embodiments, a laboratory experiment was conducted to simulate the two processes. Using the same flue dust in both cases, it was found that at a temperature of 1,800 degrees F., 97 percent of the lead was removed from the flue dust after 15 minutes when no carbon was added to the flue dust. In contrast, when the flue dust was mixed with coke, less than 50 percent of the lead was removed under the same conditions. Metallic lead has a lower vapor pressure and requires higher temperatures and longer residence times to be removed by vaporization.

In summary, it can be seen that by introducing the flue dust containing zinc compounds, lead compounds and iron compounds separately from the carbonaceous material, and heating the flue dust to cause a substantial portion the lead to become gas-borne before the carbonaceous material is mixed with the flue dust, a greater portion of the lead will become gas-borne, and therefore a greater portion of the lead will be removed from the flue dust.

While the invention has been described in terms of providing increased beneficial vaporization of lead in the form of lead chloride, it is possible that other lead compounds could be present and also beneficially vaporized prior to combination of the lead compounds with carbon. Further, heating of the zinc and cadmium constituents of the flue dust prior to the introduction of the carbon could also provide improved vaporization of the zinc and cadmium.

The principle and mode of operation of this invention have been described in its preferred embodiments. However, it should be noted that this invention may be practiced otherwise than as specifically illustrated and described without departing from its scope.

What is claimed is:

1. A method of processing flue dust that contains one or more compounds from a first group consisting of zinc, lead and cadmium compounds, and contains iron compounds, the method comprising introducing the flue dust into a closed vessel at a first location, heating the flue dust to cause a substantial portion of one or more of the compounds of the first group to become gas-borne, thereby consuming a portion of the flue dust, introducing a carbonaceous material to the remaining flue dust at a second location within the same vessel, thereby creating a flue dust/carbonaceous material mixture, and heating the flue dust/carbonaceous material mixture to cause a substantial portion of the remaining compounds from the first group to become gas-borne while retaining a substantial portion of the iron in a non-gas-borne condition, and separating the gas-borne compounds from the non-gas-borne compounds.

2. The method of claim 1 in which the closed vessel is a rotating cylindrical retort, and the step of heating the flue dust to cause a substantial portion of one or more of the compounds of the first group to become gas-borne, the step of introducing the carbonaceous material to the remaining flue dust, and the step of heating the flue dust/carbonaceous material mixture are all carried out in the rotating cylindrical retort.

3. The method of claim 1 in which the first location is a feed end of the vessel and the second location is at a position downstream from the feed end of the vessel.

4. The method of claim 3 in which the flue dust is introduced into the feed end of the vessel with a feeder and the carbonaceous material is introduced into the vessel with a different feeder.

5. The method of claim 1 in which the amount of carbonaceous material in the flue dust/carbonaceous material mixture is within the range of from about 10 to about 30 percent by weight of the total mixture of flue dust and carbonaceous material.

6. A method of processing flue dust that contains lead compounds and iron compounds, the method comprising heating the flue dust in a closed vessel to cause a substantial portion the lead to become gas-borne, thereby consuming a portion of the flue dust, introducing a carbonaceous material to the remaining flue dust within the same vessel, thereby creating a flue dust/carbonaceous material mixture, heating the flue dust/carbonaceous material mixture to cause additional constituents of the flue dust to become gas-borne while retaining a substantial portion of the iron in a non-gas-borne condition, and separating the gas-borne compounds from the non-gas-borne compounds.

7. The method of claim 6 in which the lead in the flue dust is in the form of lead chloride.

8. The method of claim 6 in which the vessel is a rotating cylindrical retort, and the step of heating the flue dust to cause a substantial portion of the lead to become gas-borne, the step of introducing the carbonaceous material to the remaining flue dust, and the step of heating the flue dust/carbonaceous material mixture are all carried out in the rotating cylindrical retort.

9. The method of claim 6 in which the flue dust is introduced into a feed end of the vessel and the carbonaceous material is introduced into the vessel at a position downstream from the feed end of the vessel.

10. The method of claim 9 in which the flue dust is introduced into a feed end of the vessel with a feeder and the carbonaceous material is introduced into the vessel with a different feeder.

11. The method of claim 6 in which the amount of carbonaceous material in the flue dust/carbonaceous material mixture is within the range of from about 10 to about 30 percent by weight of the total mixture of flue dust and carbonaceous material.

12. A method of processing flue dust that contains one or more compounds from a first group consisting of zinc, lead and cadmium compounds, and contains one or more compounds from a second group consisting of iron, silicon, calcium, magnesium and aluminum compounds, the method comprising introducing the flue dust into a closed vessel at a first location, heating the flue dust to cause a substantial portion of one or more of the compounds of the first group to become gas-borne, thereby consuming a portion of the flue dust, introducing a carbonaceous material to the remaining flue dust at a second location within the same vessel, thereby creating a flue dust/carbonaceous material mixture, and heating the flue dust/carbonaceous material mixture to cause a substantial portion of the remaining compounds from the first group to become gas-borne while retaining a substantial portion of the second group in a non-gas-borne condition, and separating the gas-borne compounds from the non-gas-borne compounds.

13. The method of claim 12 in which the vessel is a rotating cylindrical retort, and the step of heating the flue dust to cause a substantial portion of one or more of the compounds of the first group to become gas-borne, the step of introducing the carbonaceous material to the remaining flue dust, and the step of heating the flue dust/carbonaceous material mixture are all carried out in the rotating cylindrical retort.

14. The method of claim 12 in which the first location is a feed end of the vessel and the second location is at a position downstream from the feed end of the vessel.

15. The method of claim 14 in which the flue dust is introduced into a feed end of the vessel with a feeder and the carbonaceous material is introduced into the vessel with a different feeder.

16. The method of claim 12 in which the amount of carbonaceous material in the flue dust/carbonaceous material mixture is within the range of from about 10 to about 30 percent by weight of the total mixture of flue dust and carbonaceous material.

* * * * *